United States Patent [19]

Takaoka

[11] Patent Number: 5,738,892
[45] Date of Patent: Apr. 14, 1998

[54] METHOD OF GERMINATING AND DRYING CEREAL

[76] Inventor: Terumi Takaoka, 2225 Oazanorinouchiko, Kawauchicho, Onsengun, Ehime-Pref., Japan

[21] Appl. No.: 711,217

[22] Filed: Sep. 9, 1996

[30] Foreign Application Priority Data

Apr. 11, 1996 [JP] Japan .................... 8-115402

[51] Int. Cl.$^6$ .................... A23B 9/00
[52] U.S. Cl. .................... 426/242; 426/459; 426/507
[58] Field of Search .................... 426/459, 462, 426/507, 242; 34/266

[56] References Cited

U.S. PATENT DOCUMENTS 3,640,206  2/1972  Moisescu et al. .................... 426/462
4,555,409  11/1985  Hart .................... 426/462
5,024,145  6/1991  Bailey et al. .................... 34/266

FOREIGN PATENT DOCUMENTS 1-244270  9/1989  Japan .................... 34/366

*Primary Examiner*—George Yeung
*Attorney, Agent, or Firm*—Moonray Kojima

[57] ABSTRACT

The invention relates to a method of germinating and drying cereal such as rice, wheat, soybean and corn seeds, in which a husked cereal is subjected to moisture treatment to germinate the cereal. The germination is suspended after germinated cereal is produced. The germinated cereal is dried at a temperature of about 30° C. and irradiated with far infrared rays to dry the inside thereof and cause absorbed nutrients of the germinated cereal to be readily extractable.

11 Claims, 5 Drawing Sheets

METHOD OF GERMINATING AND DRYING CEREAL

BACKGROUND OF THE INVENTION

1. Field of the Invention

The present invention relates to a processing method of germinating cereal for extracting the nutrient of cereal such as rice, wheat, barley, soybean, and corn seeds to the optimum state.

2. Description of the Prior Art

Generally, cereals such as husked rice, wheat, barley, soybean and corn seeds contain protein, fat, starch, and minerals (collective name including four macroelements sodium, potassium, calcium and magnesium, and essential trace minerals such as iron, zinc, copper, iodine, chromium, cobalt, and manganese), and are hence known to be good for health.

Such cereal, for example, husked rice is taken directly without processing, digestion of protein and absorption of minerals are disturbed by phytic acid (bond of phosphorus and inositol) which is one of acids contained in husked rice, and the nutrient is not absorbed in the body but is excreted, and when much phytic acid (myoinositol-6 phosphoric acid) is taken, absorption of calcium, magnesium, iron and zinc is disturbed in the intestine, and nutrition troubles may be caused.

To solve such problems, there is germ rice prepared only by germinating the husked rice, but the conventional germ rice was merely germinated, dried, and frozen, and the nutrient of the rice is not extracted to the optimum state so as to be easily absorbed sufficiently in the body, and this holds true, aside from husked rice, also in husked wheat, barley, soybean, and corn seeds.

SUMMARY OF THE INVENTION

It is hence a primary object of the invention to present a processing method of germination cereal characterized by drying germination cereal at low temperature, and irradiating with far infrared rays to dry into the inside, thereby germinating to transform protein into amino acid, fat into essential fatty acid, starch into sugar, and mineral into form bonded with amino acid, so as to be easily absorbed in the body, and moreover zinc, other minerals and vitamins are increased several times, and by drying securely deep inside, the nutrient of the cereals is extracted to the optimum state by far infrared ray activity so as to be absorbed sufficiently in the body, and the germination cereals in this state can be directly taken or mixed with ordinary cereals.

It is other object of the invention to present a processing method of germination cereal characterized by irradiating germination cereal after drying at low temperature uniformly with far infrared rays, and processing germination cereal uniformly by far infrared rays, so that the optimum extracting effect of the nutrient may be further enhanced.

It is a different object of the invention to present a processing method of germination cereal characterized by irradiating germination cereal with far infrared rays from different directions so as to achieve uniform far infrared ray processing on germination cereal.

It is other different object of the invention to present a processing method of germination cereal characterized by changing the direction (longitudinal, lateral, or face-back direction) of germination cereal during far infrared ray processing by inverting, oscillating or agitating process so as to achieve uniform far infrared ray processing on germination cereal.

It is a still other object of the invention to present a processing method of germination cereal characterized by setting the germination cereal as germination husked rise, husked wheat, husked barley, soybean or corn seeds, so that the nutrient of these cereals may be extracted to the optimum state so as to be absorbed smoothly in the body.

Other objects of the invention will be better understood from the following detailed description taken in conjunction with the accompanying drawings.

DESCRIPTION OF THE PREFERRED EMBODIMENTS

Figure 1:
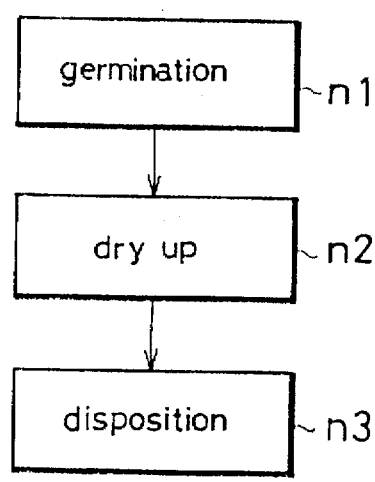
FIG. 1 is a process diagram showing a processing method of germination cereal of the invention.

Referring now to the drawings, embodiments of the invention are described in detail below.

The drawings show the processing method of germination cereal, and the cereal is germinated at first step n1 of processing step drawing in FIG. 1. The cereal may be husked rice, husked wheat, husked barley, soybean, or corn seeds, and hereinafter an example of using husked rice is shown for the convenience of explanation. At this time, as the moisture necessary for germination, spa water containing minerals abundantly is used.

After germination of rice, germination is once suspended by cold water, and at second step n2, this germination cereal is dried in low temperature condition of about 30° C.

Figure 2:
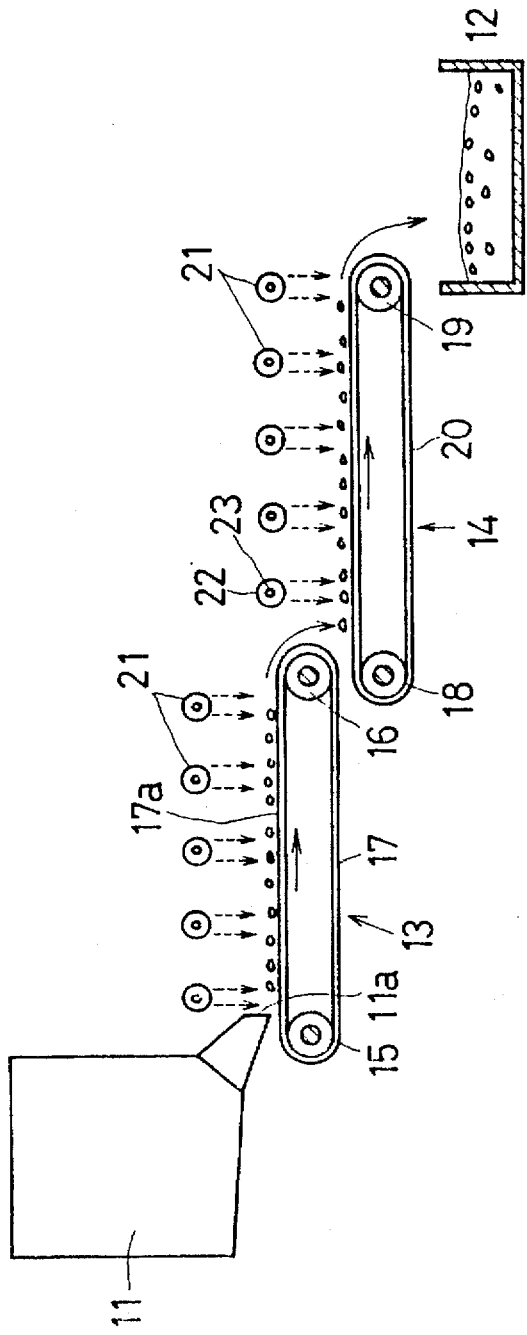
FIG. 2 is an explanatory diagram showing an embodiment of a processing apparatus used in far infrared ray processing.

Consequently, at third step n3, using the processing apparatus shown in FIG. 2, the germination rice after low temperature drying is irradiated with far infrared ray to dry into the inside.

In the processing apparatus shown in FIG. 2, between a hopper 11 as germination cereal supply means, and a recovery box 12 as recovery means of cereal after far infrared ray processing, there are front belt conveyor 13 and rear belt conveyor 14 as means for emitting far infrared rays uniformly to process with far infrared rays.

The front belt conveyor 13 has an endless belt 17 stretched horizontally between rollers 15 and 16, and a conveying surface 17a of this endless belt 17 is disposed beneath an outlet 11a of the hopper 11 to lay out horizontally, whereas the rear belt conveyor 14 has an endless belt 20 stretched horizontally between rollers 18 and 19, and this rear belt conveyor 14 is horizontally laid out at an intermediate position between the lower surface of the front belt conveyor 13 and upper surface of the recovery box 12, and hence it is constituted to invert the rice to be processed when the rice to be processed is dropped from the transfer terminal end side (right end side in FIG. 2) of the front belt conveyor 13 into the transfer start end side of the rear belt conveyor 14.

Above thus constituted front and rear belt conveyors 13, 14, plural far infrared ray emitting devices 21 . . . are disposed at equal intervals.

The far infrared ray emitting device 21 is composed by disposing a Nichrome wire 23 inside a ceramic bar member 22, and when the Nichrome wire 23 is energized, this far infrared ray generating means emits far infrared rays with wavelength of 5 to 100 μm as indicated by dotted line arrow in FIG. 2.

When processing by using the processing apparatus shown in FIG. 2, the germination rice processed up to the second step n2 in FIG. 1 is charged into the hopper 11, and far infrared rays are generated from the far infrared ray emitting devices 21, and, with the belt conveyors 13, 14 in driven state, the germination rice is supplied onto the endless belt 17 of the front belt conveyor 13 from the hopper 13, then the germination rice is slowly conveyed in the arrow direction in FIG. 2, while the germination rice is irradiated with far infrared rays, and as the germination rice is dropped from the transfer terminal end of the front belt conveyor 13 into the transfer start end of the rear belt conveyor 14, the germination rice is inverted.

While the inverted germination rice is conveyed in the arrow direction in FIG. 2 by the endless belt 20 of the rear belt conveyor 14, similarly, the germination rice is irradiated with far infrared rays, and the rice after processing with far infrared rays falls from the transfer terminal end of the rear belt conveyor 14 into the recovery box 12, and is collected.

The processed germination rice finishing the whole process from first step n1 to third step n3 in FIG. 1 may be directly taken, or, to be taken more deliciously, may be mixed with ordinary milled rice (usually about 10% of processed germination rice in milled rice) and cooked and taken, or may be taken as gruel.

Or the processed germination rice may be once ground and mixed in juice or other beverage, or this powder may be used and processed into noodles, bread, or cakes.

This powder may be also reprocessed in granular health food, or the powder of the processed germination rice may be blended with powder of kale processed by far infrared rays to be presented in granular form.

Whether the germination rice activated with far infrared rays is ground to powder to reprocessed, the optimum extraction effect of the nutrient of the husked rice is invariable, and it is easily absorbed in the body sufficiently.

Table 1 shows the results of measurement of magnetic pulsation of ordinary milled rice, and mixture of milled rice with specified amount of processed germination rice, in which the greater value means the greater effect in each item of measurement. In Table 1, embodiment 1 shows a mixed example of ordinary milled rice with processed germination rice of the embodiment, comparative example 1 refers to milled rice only, embodiment 2 is a mixed example of ordinary milled rice with processed germination rice of the embodiment, and comparative example 2 refers to milled rice only.

TABLE 1

| Measuring item | Embodiment 1 | Comparative example 1 | Embodiment 2 | Comparative example 2 |
| --- | --- | --- | --- | --- |
| Immunity | 22 | 19 | 21 | 19 |
| Hippocampus | 23 | 13 | 21 | 18 |
| Dementia | 21 | 9 | 21 | 9 |
| Brain | 16 | 14 | 17 | 14 |

TABLE 1-continued

| Measuring item | Embodiment 1 | Comparative example 1 | Embodiment 2 | Comparative example 2 |
| --- | --- | --- | --- | --- |
| Constipation | 22 | 21 | 21 | 21 |
| Rheumatism | 15 | 12 | 14 | 12 |
| Allergy | 20 | 14 | 15 | 15 |

As clear from Table 1, in the mixture of processed germination rice of the embodiment, the measurements of magnetic pulsation show evidently excellent effects in all items.

Instead of the germination rice explained as an example of germination cereal above, when the husked wheat, husked barley, soybean or corn seeds were processed similarly, excellent effects nearly same as in Table 1 were obtained.

By using germination barley or corn seeds as germination cereal, they can be used as the material of cakes by grinding into powder after processing, or by using germination soybean, it may be processed and prepared into beam powder or bean curd.

When germination wheat is used as germination cereal, it may be reprocessed into bread or noodles, or may be mixed with flour to be baked into bread. Thus, the germination cereals processed by far infrared rays may be taken directly or ground into powder or reprocessed into other form. In any state, the optimum extracting effect of the nutrient of the germination cereal is invariable, and it is sufficiently absorbed in the body.

Figure 3:
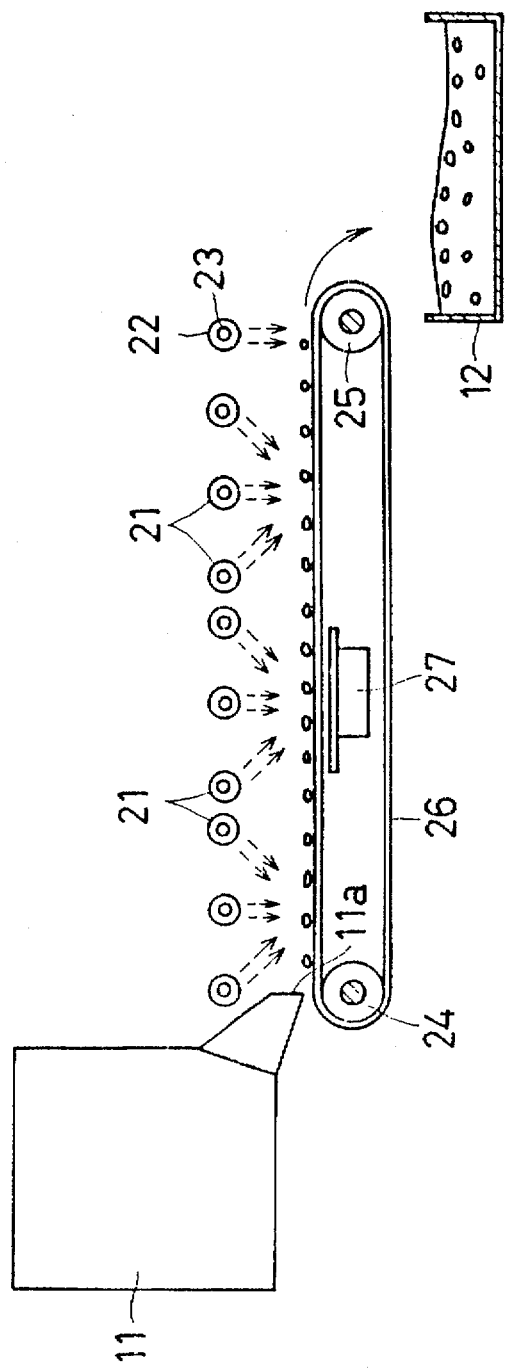
FIG. 3 is an explanatory diagram showing other embodiment of a processing apparatus used in far infrared ray processing.

FIG. 3 shows other means for emitting far infrared rays uniformly and processing evenly, in which an endless belt 26 is stretched between front and rear rollers 24, 25, and the emitting directions of far infrared rays from the plural far infrared ray emitting devices 21 disposed above the belt 26 are designed to be different directions. That is, the germination cereal conveyed on the belt 26 is irradiated with far infrared rays from behind the conveying direction, from ahead of the conveying direction, and from right above.

In the lower part of the conveying surface of the belt 26, moreover, there is an oscillating device 27 for oscillating the germination cereal through the belt 26 to change its direction. Proper guide members are provided at both sides of the belt 26, so that the germination cereal on the belt 26 may not flow out of the belt due to vibration.

In this constitution, too, by emitting far infrared rays uniformly to the germination cereal after drying at low temperature, the germination cereal can be processed evenly with far infrared rays, and although specific explanation is omitted in FIG. 3 by identifying similar parts with same reference numerals as in the previous drawings, similar effects are obtained by emitting far infrared rays from different right and left directions to the running direction of the germination cereal conveyed on the belt 26, and it is more effective by attaching light reflecting means such as an elastic tape member to the surface of the belt 26.

Figure 4:
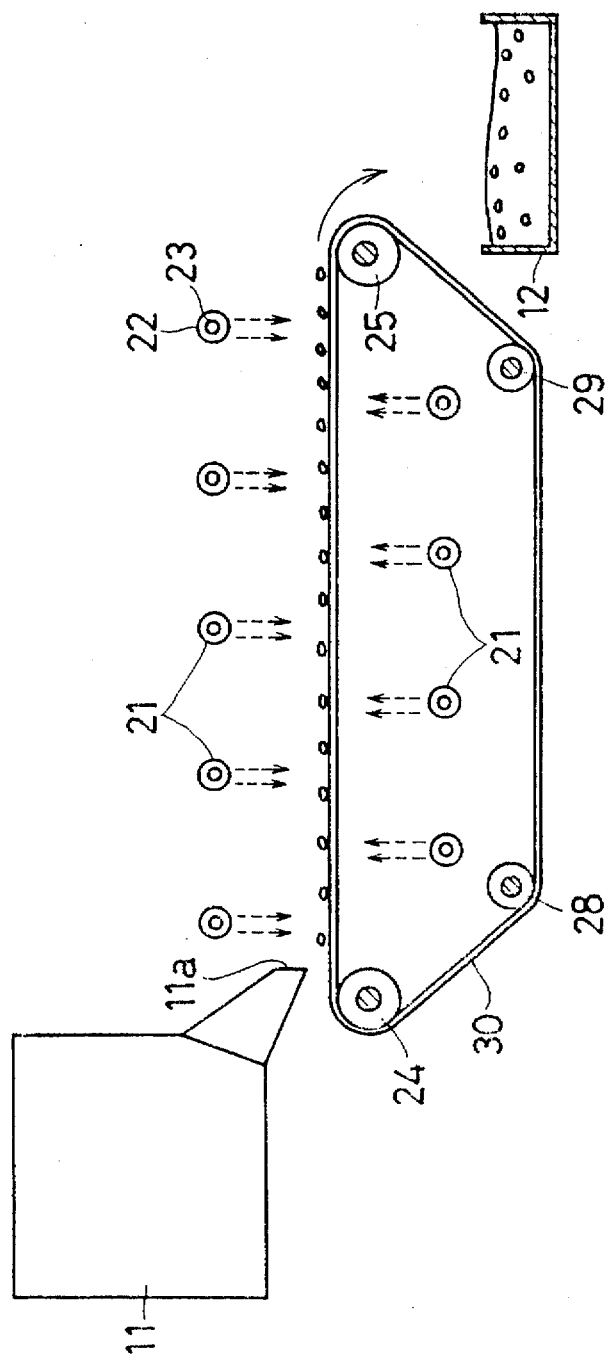
FIG. 4 is an explanatory diagram showing a different embodiment of a processing apparatus used in far infrared ray processing.

FIG. 4 shows different means for emitting far infrared rays uniformly and processing evenly, in which a transparent endless belt 30 for passing far infrared rays is stretched between the front and rear rollers 24, 25, and lower idle rollers 28, 29, and far infrared ray emitting devices 21 . . . are disposed above and beneath the conveying surface 30a of the belt 30, so that the germination cereal may be irradiated with far infrared rays from above and beneath.

As the belt 30, it is recommended to use a polyethylene elastic belt excellent in far infrared ray transmissivity.

In this constitution, too, by emitting far infrared rays uniformly to the germination cereal from upper and lower different directions after drying at low temperature, the germination cereal can be processed evenly with far infrared rays, and although specific explanation is omitted in FIG. 4 by identifying similar parts with same reference numerals as in the previous drawings, similar effects are obtained by replacing the transparent flexible belt 30 with an endless flexible mesh belt set at a specific mesh so as not to allow the germination cereal to fall down.

Figure 5:
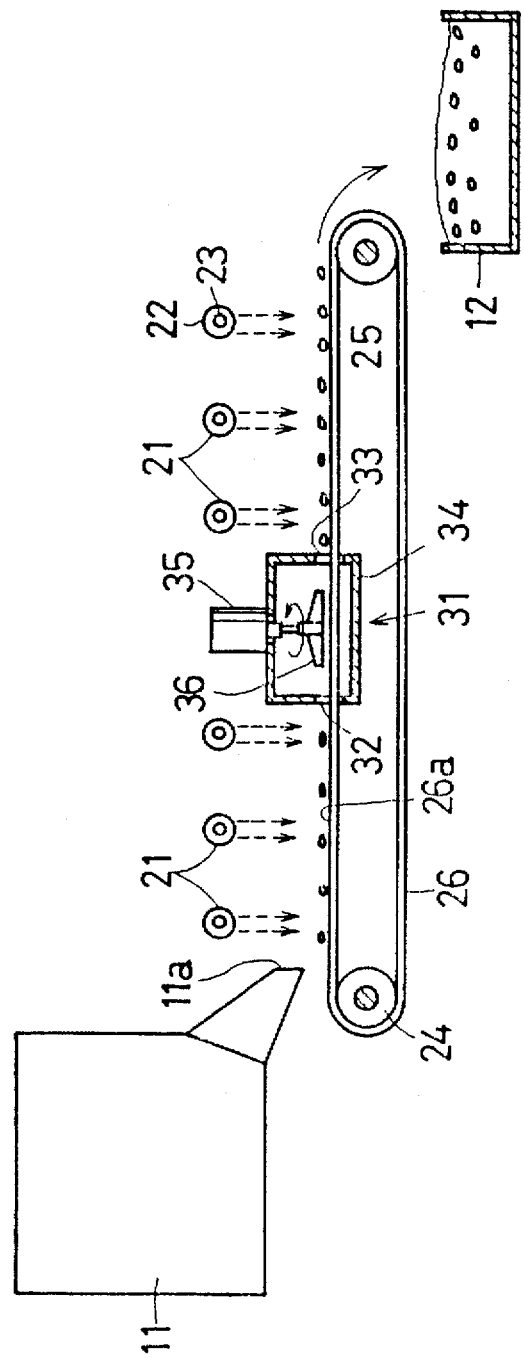
FIG. 5 is an explanatory diagram showing other different embodiment of a processing apparatus used in far infrared ray processing.

FIG. 5 shows further different means for emitting far infrared rays uniformly and processing evenly, in which agitating means 31 for agitating the germination cereal to change its direction is provided at an intermediate position of the conveying surface 26a of the endless belt 26.

This agitating means 31 comprises a drift preventive box allowing the belt 26 to run and having inlet 32 and outlet 33 of germination cereal, and an agitation member 36 agitated and driven by a motor 35 as rotating means, and the germination cereal conveyed from the inlet 32 into the box 34 on the belt 26 is agitated by the torque of the agitation member 36, and its direction is changed to discharge from the outlet 33.

In this constitution, the direction of germination cereal on the belt 26 positioned between the outlet 11a of the hopper 11 and the inlet 32 of the agitating means 31, and the direction of germination cereal on the belt 26 positioned between the outlet 33 of the agitating means 31 and the conveying direction terminal end of the belt 26 are different, so that the germination cereal may be processed evenly by irradiating uniformly with far infrared rays. In FIG. 5, same parts as in the previous drawings are identified with same reference numerals, and detailed description is omitted, but the means in FIG. 2, FIG. 3, FIG. 4, and FIG. 5 may be properly combined.

In short, according to the processing method of the invention, germination cereal such as husked germination rice, husked germination wheat, husked germination barley, germination soybean, and germination corn seeds is dried at low temperature, and irradiated with far infrared rays to dry deep inside, so that the following actions and effects are brought about.

That is, by germinating the cereal, phosphorus is supplied, and phosphoric acid enzyme acts to decompose phytic acid into phosphoric acid and inositol, and the protein is transformed into amino acid, fat into essential fatty acid, starch into sugar, and mineral into form bonded with amino acid, and hence it is easier to be absorbed in the body, and zinc, other minerals, and vitamins are increased several times.

Since the germination cereal is processed by far infrared rays after once drying at low temperature, it is securely dried deep inside, and the nutrient of the cereal is extracted to the optimum state by activity of far infrared rays, and it is effective to process into such form as to be absorbed sufficiently in the body.

Moreover, since the germination cereal is uniformly irradiated with far infrared rays, the germination cereal is evenly processed with far infrared rays, and the optimum extracting effect of the nutrient may be further enhanced.

What is claimed is:

1. A method of germinating and drying cereal, comprising the steps of:
    subjecting a husked cereal to moisture treatment to germinate said cereal;
    suspending said germination after germinated cereal is produced;
    drying said germinated cereal at a temperature of about 30° C.; and
    irradiating said germinated cereal with far infrared rays thereby to dry the inside thereof and cause absorbed nutrients of the germinated cereal to be readily extractable.

2. The method of claim 1, wherein said far infrared rays are directed uniformly at said germinated cereal.

3. The method of claim 1, wherein said far infrared rays are directed at said germinated cereal from different directions.

4. The method of claim 1, wherein said germinated cereal is inverted while being subjected to said far infrared rays.

5. The method of claim 1, wherein said germinated cereal is oscillated while being subjected to said far infrared rays.

6. The method of claim 1, wherein said germinated cereal is agitated while being subjected to said far infrared rays.

7. The method of claim 1, wherein said germnated cereal is of husked rice.

8. The method of claim 1, wherein said germinated cereal is of husked wheat.

9. The method of claim 1, wherein said germinated cereal is of husked barley.

10. The method of claim 1, wherein said germinated cereal is of husked soybean.

11. The method of claim 1, wherein said germinated cereal is of husked corn.

* * * * *